June 16, 1931.  H. P. HOLLNAGEL  1,810,605
SOUND RECORDING
Filed Nov. 13, 1926
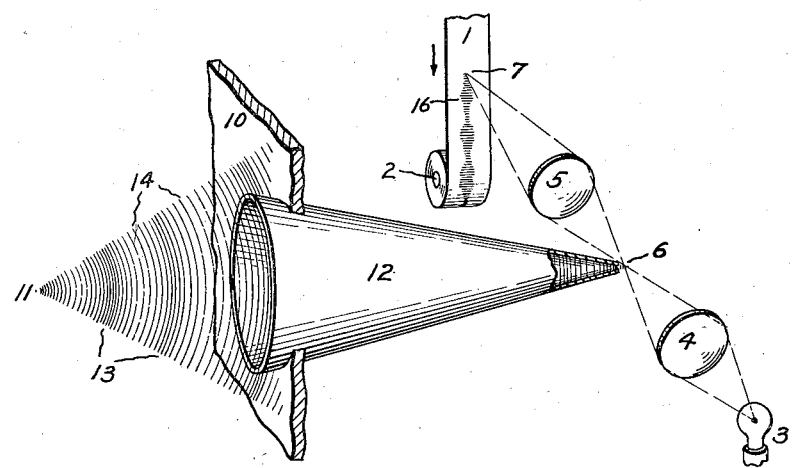
Inventor
Herbert P. Hollnagel,
by Alexander S. Lane
His Attorney.

Patented June 16, 1931

1,810,605

UNITED STATES PATENT OFFICE

HERBERT P. HOLLNAGEL, OF SWAMPSCOTT, MASSACHUSETTS, ASSIGNOR TO GENERAL ELECTRIC COMPANY, A CORPORATION OF NEW YORK

SOUND RECORDING

Application filed November 13, 1926. Serial No. 148,185.

My invention relates to sound recording and particularly to photographically recording sound waves. An object of my invention is the provision of an improved method for this purpose and apparatus for carrying out the method which shall be devoid of any moving parts actuated by the sound waves to be recorded, thereby eliminating inertia effects common to many forms of present sound recording apparatus.

My invention will be better understood from the following description taken in connection with the accompanying drawing, and its scope will be pointed out in the appended claims.

In the single figure of the drawing, which is a diagrammatic illustration of my invention, I have shown a sensitized film 1 which is being wound up on a reel 2 from another reel, not shown. A source of light 3, shown for example as an electric light bulb, is arranged in front of the film 1 and separated from it by an optical system comprising lenses or mirrors for directing a spot of light on the film. I have shown the optical system as comprising the lenses 4 and 5 which are so arranged that a beam of light from the source 3 is concentrated by lens 4 to a focal point 6 from which it again diverges to lens 5. The beam is again brought to a focus or approximate focus by lens 5 on the film 1 at 7. The lens 5 preferably is placed closer to the focal point 6 than to the film whereby variations in the beam at the focal point 6 may be magnified at the film. I also prefer to use quartz or fluorite lenses or mirrors in the optical system. While I have termed the part 3 as a source of light, it is to be understood that I use the term light in its broadest sense, intending thereby to cover both visible and invisible rays. Since for the present purpose, radiation of short wave lengths is the more suitable, it may be found desirable to use as a source 3 a lamp whose emanation is rich in violet or ultra-violet rays.

At 10 I have shown a partition separating the optical system from a source 11 of sound waves which are to be recorded on the film. The partition is shown penetrated by a conical sound concentrating member 12 whose large end is adapted to receive the sound vibrations. The member 12 terminates at its small end in a small opening directly in front of the focal point 6.

The condensations and rarefactions of the air comprising the sound waves emanating from the sound source 11 and represented respectively at 13 and 14 become intensified as they progress through the tapering member 12 to a point of discharge at the small end of the member. The resulting amplified changes in density of the air at the focal point 6 produce corresponding variations in the refraction of the light beam at that point and hence variations in the spot of light reaching the film. The nature of the effect may be likened to that of spherical aberration of a lens. The image 16 which is photographed on the film 1 as it moves downwardly is double and is the envelope of a composite wave comprising the fundamental and the overtones of the sound recorded. In the construction of the apparatus which I have shown only diagrammatically in the drawing, it will, of course, be understood that the film will be protected from stray light by a suitable housing and suitable means will be employed for moving the film at the desired speed.

What I claim as new and desire to secure by Letters Patent of the United States is:

1. The method of varying a beam of light in accordance with sound waves, which comprises causing the beam to pass through a point of concentration and varying the density of sound transmitting medium at said point by concentrating the sound waves thereon.

2. The method of varying a light beam in accordance with sound waves independently of any inertia effect other than that of the sound transmitting medium, which comprises concentrating the light beam and the sound waves at a common point remote from the light source.

3. The method of recording sound waves by means of a light beam on a light sensitive member independently of any sound vibrated means other than the medium through which the sound is propagated which comprises concentrating the light beam and the sound waves at a common point remote from the light source and reconcentrating the beam on the light sensitive member.

4. Apparatus for forming an image of sound waves comprising an image receiving member, a source of light, means for producing a point of concentration of the light directed on the receiving member and means for refracting the light at said point by directing a concentration of the sound waves on said point.

5. Sound recording apparatus comprising a light sensitive member, a source of light directed toward said member, means in the path of said light producing a focal point thereof, and a sound gathering means having an outlet arranged to direct the sound waves on said focal point.

6. Sound recording apparatus comprising a light sensitive member, a source of light, means for causing a beam of light from said source to pass through a focal point and to be projected therefrom on said member and means for concentrating sound waves at said focal point, thereby to vary the density of the sound transmitting medium at the focal point.

7. Sound recording apparatus comprising a movable light sensitive member, a source of light, an optical system for causing a beam of light from said source to pass through a focal point and to be projected on said member, and a sound concentrating member having its outlet directed toward said focal point.

8. Sound recording apparatus comprising a movable sensitized film, a source of light, an optical system comprising a pair of lenses between which a beam of light from said source is caused to pass through a focal point and beyond which the beam is again concentrated on said film, and a conical sound concentrating member having its small end open and arranged opposite to said focal point.

In witness whereof, I have hereunto set my hand this 28th day of October, 1926.

HERBERT P. HOLLNAGEL.